United States Patent Office 3,494,955
Patented Feb. 10, 1970

3,494,955
N-ACETONITRILE-HALOCINNAMAMIDES
Bernard Loev, Broomall, Pa., assignor to Smith Kline & French Laboratories, Philadelphia, Pa., a corporation of Pennsylvania
No Drawing. Original application Aug. 22, 1966, Ser. No. 573,828, now Patent No. 3,415,880. Divided and this application Nov. 22, 1968, Ser. No. 778,341
Int. Cl. C07c *103/22*
U.S. Cl. 260—465                   4 Claims

ABSTRACT OF THE DISCLOSURE

N-acetonitrile-halocinnamamides are described which are of use as intermediates for preparing biologically active halocinnamoylaminoacetamide derivatives. These nitrile compounds are prepared by reacting a halocinnamoyl chloride with an aminoacetonitrile salt.

---

This application is a division of Ser. No. 573,828 filed Aug. 22, 1966, now U.S. Patent No. 3,415,880.

This invention relates to novel halo substituted cinnamoylaminoacetamide compounds which have biological activity and to certain intermediates for preparing these compounds.

The compounds of this invention are illustrated by the following structural formula:

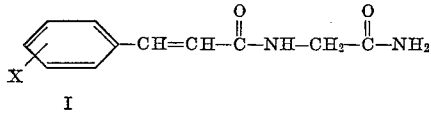

I in which X is halo, such as chloro, fluoro, bromo, or trifluoromethyl, said substituent being preferably in the 4 or para-position.

The compounds of this invention are prepared by converting a halocinnamic acid to its acid chloride by standard methods such as with thionyl chloride, reacting the acid chloride with aminoacetonitrile to give the novel N-acetonitrile-halo-cinnamamide which has no antidepressant activity but does have some diuretic activity. The nitrile is then converted to the desired acetamide via the iminoester. These reactions are all thoroughly described in the examples. The halocinnamic acid starting materials are either commercially available or are prepared from the halobenzaldehyde using the Perkin reaction.

The end products of this invention can also be prepared by other synthetic methods, such as condensing the halocinnamic acid chloride directly with glycinamide or condensing a halobenzaldehyde with N-acetylglycinamide.

The compounds of this invention are distinguished by their antidepressant activity. This activity resembles in effect but not by mechanism that induced by monoamine oxidase inhibitors. Also, the activity does not resemble that of the pure stimulants, such as amphetamine, since the compositions involved do not reverse reserpine induced ptosis as does amphetamine.

The novel antidepressant activity is demonstrated by the standard test employing the prevention of reserpine induced ptosis in mice as disclosed by E. Costa et al., Experientia 16, 461–463 (1960) and F. Sulser et al., Fed. Proc. 19, 268 (1960). Groups of 10 $CF_1$ male mice weighing 20–25 gms. were used, one group as control. Oral doses of 10, 25 and 40 mg./kg. suspended in tragacanth solution were administered orally each to a group of mice followed at various time intervals by 1 mg./kg. of reserpine i.v. with observation for prevention of the ptosis effect for 45 minutes after dosage.

In this standard test p-chlorocinnamoylaminoacetamide had an $ED_{50}$ of 23.5 mg./kg. (15.4–35.9) with the following specific data:

| Dose | Time | Animals | Percent Showing Prevention |
|---|---|---|---|
| 10(base) | 60 | 10 | 20 |
| 25 | 60 | 10 | 40 |
| 25 | 180 | 10 | 30 |
| 40 | 60 | 10 | 1 80 |
| Controls | | 20 | 0 |

[1] No side effects.

In the same test the standard antidepressant drugs amitriptyline and imipramine had $ED_{50}$'s of 15.5 and 10.5 mg./kg. respectively, in mice.

This compound is a similar test in rats had an $ED_{50}$ of 23.5 mg./kg. (12.4–44.7). An oral dose of 100 mg./kg. does not reverse reserpine ptosis.

The antidepressant compositions using this invention comprise an active halo substituted cinnamoylaminoacetamide as described above in a dosage unit form suitable for internal, preferably oral, administration such as a tablet, capsule, suspension, sterile solution or suspension, troche, wafer, etc. Standard pharmaceutical carriers may be present such as lactose, magnesium, stearate, terra alba, sucrose, talc, stearic acid or its glycol esters, gelatin, agar pectin, or acacia, peanut oil, hydrogenated castor oil, olive oil, sesame oil or water.

The pharmaceutical dosage units are prepared by standard methods such as by mixing with a carrier and filled into a hard gelatin capsule, by granulating and tableting, by suspending a micronized powder in a suitable sterile parenteral vehicle or by suspending in a water base with a thickening agent such carboxymethylcellulose for an oral liquid product. The dosage units will contain sufficient active compound to have effective antidepressant activity but still not show limiting toxic side effects. A unit dose range of from about 10–150 mg. therefore would be exemplary for producing antidepressant activity in warm blooded mammals.

One skilled in the art will recognize that for calculating the amounts of active ingredients in the claimed dosage unit compositions it is often convenient to use mg./kg. amounts depending on the activity of the chemical ingredient as well as the size and pharmacology of the host animal. In such claimed compositions the active chemical will be present in about 0.25–75 mg./kg. preferably about 10–50 mg./kg. amounts.

To my knowledge no halocinnamoylaminoacetamides have been described in the prior art. Cinnamoylaminoacetamide as a bare chemical was disclosed by Knunyants, I.L. and Gambaryan, N.P., Izvest. Akad. Nauk S.S.S.R., Otdel. Khim. Nauk 1037 (1955); Chem. Abst., 50; 11277; but no mention of the claimed compounds nor of their unexpected biological activity is made.

The compounds of this invention may exist as either the cis or trans isomers with the latter more common and preferred. The cis isomers are prepared either by treating the normal trans isomers in a suitable solvent medium with ultraviolet light or by using the cis isomer of the starting material in the described chemical procedures.

The description above and the following examples are designed to teach those skilled in the art of operation of this invention fully. The heart of this invention is considered to be the benz-substituted halocinnamoylaminoacetamide chemicals coupled with antidepressant biological activity.

EXAMPLE 1

A mixture of 25 g. of p-chlorocinnamic acid and 100 ml. of thionyl chloride is heated at reflux for two hours, then concentrated to leave 28.9 g. of brown oil.

A solution of 42 g. of sodium hydroxide in 250 ml. of water is prepared, chilled, then mixed with 49.3 g. of aminoacetonitrile bisulfate. The mixture is maintained at 0° C. while the oily acid chloride (28.9 g.) in 250 ml. of benzene is added dropwise over 15 minutes. A white solid separates which is separated, washed with water, dilute hydrochloric acid and water then recrystallized from ethanolmethanol to give N-acetonitrile-p-chlorocinnamamide, M.P. 172.5–175° C.

The nitrile (5 g.) is dissolved in 75 ml. of dry tetrahydrofuran with 2 ml. of ethanol. At 15° C., anhydrous hydrogen bromide is slowly bubbled through the mixture for ten minutes. After standing at 0° C. for five minutes, the mixture is diluted with ether to give the iminoester hydrobromide, M.P. 113–118° C., which is added to water and heated at 70° C. for 30 minutes then cooled. The resulting product is ethyl p-chlorocinnamoylglycinate, from ethanol, M.P. 120–122.5° C.

The ester (6 g.) is suspended in 160 ml. of absolute ethanol then chilled to 0° C. when dry ammonia bubbled through the mixture. After 15 minutes the mixture is stoppered and stirred at room temperature for 18 hours. The mixture is chilled to give the desired p-chlorocinnamoylaminoacetamide, M.P. 225–230° C.

EXAMPLE 2

Substituting an equimolar quantity of m-trifluoromethylcinnamic acid in the synthetic procedure of Example 1 gives the nitrile, the ester and finally m-trifluoromethylcinnamoylaminoacetamide.

Substituting an equimolar quantity of o-bromocinnamic acid in Example 1 gives the o-bromonitrile, ester and o-bromocinnamoylaminoacetamide.

Substituting p-fluorocinnamic acid, similarly gives p-fluorocinnamoylaminoacetamide.

Substituting p-trifluoromethylcinnamic acid gives the p-trifluoromethylnitrile, ester and p-trifluoromethylcinnamoylaminoacetamide.

EXAMPLE 3

The most convenient pharmaceutical form to prepare is a hard gelatin capsule containing a chemical compound as described, combined with a conventional pharmaceutical carrier. For example, 50 mg. of p-chlorocinnamoylaminoacetamide is mixed with 200 mg. of sucrose and 2 mg. of magnesium stearate. The mixture is screened, mixed and filled into a hard gelatin capsule. The capsule is administered orally as many times per day as recommended for the desired effective but nontoxic biological activity. Other halocinamoylaminoacetamides are similarly used.

What is claimed is:

1. A chemical compound of the structural formula:

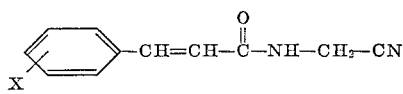

in which X is chloro, bromo, fluoro or trifluoromethyl.

2. A chemical compound of claim 1 in which X is chloro.

3. N-acetonitrile-p-chlorocinnamamide.

4. N-acetonitrile-p-trifluoromethylcinnamamide.

References Cited

UNITED STATES PATENTS

| | | | |
|---|---|---|---|
| 2,380,063 | 7/1945 | Mowry | 260—465 |
| 3,148,204 | 9/1964 | Miller | 260—465 |
| 3,349,015 | 10/1967 | Passal | 260—465 X |
| 3,371,107 | 2/1968 | De Gaetano | 260—465 |
| 3,415,880 | 12/1968 | Loev | 260—465 X |

CHARLES B. PARKER, Primary Examiner

S. T. LAWRENCE III, Assistant Examiner

U.S. Cl. X.R.

204—158; 260—558; 424—324